July 20, 1948. H. H. COOKE ET AL 2,445,312
INCENDIARY BOMB MIXTURE
Filed July 16, 1942
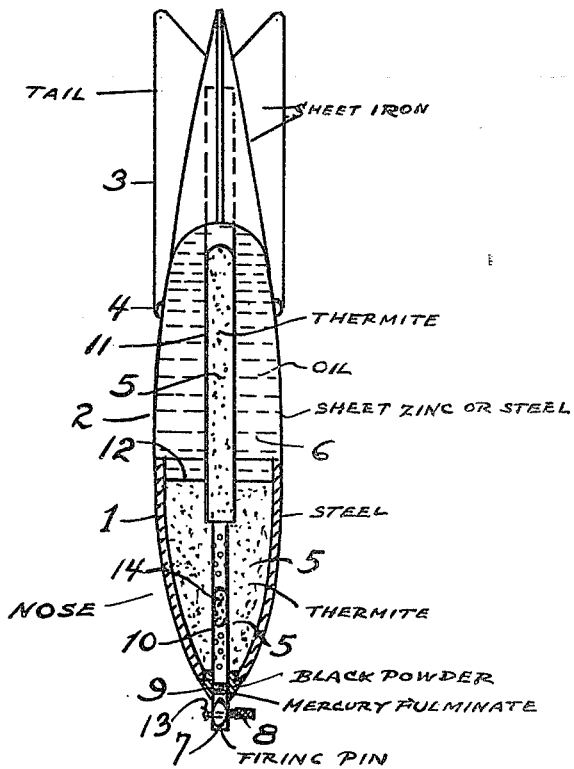

UNITED STATES PATENT OFFICE 2,445,312

INCENDIARY BOMB MIXTURE

Henry H. Cooke, Elizabeth, and John B. Holtzclaw, Roselle, N. J., assignors to Stanco Incorporated, a corporation of Delaware Application July 16, 1942, Serial No. 451,110

8 Claims. (Cl. 102—6)

This invention relates to incendiary oil bombs containing an inflammable volatile liquid hydrocarbon that is given a suitable consistency by high molecular weight polymers of isobutylene in the incendiary mixture. It has the object of making an incendiary oil mixture more effective in its function and particularly better adapted for use in airplane bombs.

Despite the intensive studies and work carried out to provide suitable incendiary agents, very few have survived tests of modern warfare and only the magnesium thermite type of bomb has become recognized as suitably efficient, though oil bombs have received most attention. Several factors have been inimical to the oil type bombs even though they would be relatively less expensive, could be used to relieve shortages of magnesium and aluminum, and could be used more advantageously than the thermite type bomb under certain circumstances.

It has been found important that the oil incendiary contain an inflammable liquid, such as a volatile hydrocarbon oil, which can ignite readily. On the other hand, a volatile oil alone burns too rapidly, or simply explodes without starting conflagration. In burning too rapidly, the oil consumes oxygen and thus tends to extinguish itself. Under some conditions, the volatile oil becomes too readily dispersed, out of contact with material intended to be ignited, and does not give the intensity of heat necessary to start destructive fires.

To prevent an incendiary oil mixture from being rendered ineffective through scattering, soaps have been admixed with the oil to form wax-like solid or solidified oil compositions, but these were not satisfactory because the solidified material made with the soaps are granular and crumbly after being exposed to low temperatures. These materials have to be used in heavy bomb casings to avoid dissipation of heat and flame from wide scattering which attends shattering of the bomb.

Another attempt to improve on the oil incendiary mixtures involved the use of raw rubber without much greater success, for in the ordinary use of the bombs from airplanes, the attacking plane is often forced to fly at high altitudes, and accordingly, the incendiary mixture in the bomb is cooled to very low temperatures even in warm seasons, thus causing the rubber to become frozen so that the oil mixture is solidified much the same as in the use of the soaps. In such a solidified form, the incendiary mixture is not readily ignited, and if scattered, becomes ineffectual.

In accordance with the present invention, the defects of oil incendiary mixtures have been overcome by incorporating iso-olefin polymers of high molecular weight with inflammable naphtha to form a highly viscous mass which is almost semisolid in consistency but which does not harden at extremely low temperatures comparable to stratosphere temperatures. This material ignites easily and burns freely even when exposed to extremely low temperatures, it remains very sticky under all conditions, i. e., when burning or cold, and upon being scattered in explosion or shattering of the bomb, is capable of carrying flame persistently in the portions thrown out to start numerous small fires which are capable of causing great destruction.

The polymers should preferably be substantially saturated (i. e., have an iodine number less than 50) and have a molecular weight above 3,000. The isobutylene polymers found most satisfactory for the present purposes are those having molecular weights above 30,000, and more preferably between about 50,000 and 100,000. These polymers are commercially available products that are produced by polymerization of isobutylene at low temperatures ranging from about $-40°$ C. to about $-100°$ C. with the aid of an active halide catalyst, such as boron fluoride. The molecular weight of these polymers or the extent of the polymerization is increased in proportion to the lowering of the reaction temperature. The crude or raw polymer product is satisfactory for the present purposes.

Polymers of other mono-olefinic polymerizable monomeric organic compounds may be used such as polyethylene, polyvinyl butyl ether, polylaurylmethacrylate, etc.

The major ingredient of the incendiary oil agent is preferably available low boiling mixtures of hydrocarbons having the characteristics of petroleum gasoline, solvent naphtha or kerosene. The volatile oil need not be refined to any particular degree. Other combustible substances, such as powdered coal, tars, turpentine, and the like may be admixed.

To obtain a suitable consistency in making up the incendiary oil mixture with the isobutylene polymers, good results are obtained in using about 1% to 25%, preferably 5–15%, by weight of the polymer based on the weight of naphtha hydrocarbons. The proportion of the polymer required is greater as the molecular weight of the polymers is lowered. The mixture obtained is a sticky viscid or gummy mass. The consistency is suitable also when the mass has fluidity and can be poured.

In the event it is desirable to make a conservation in the amount of polymer used in the mixture, small amounts of compatible soaps have been found useful for obtaining the proper consistency in substitution for a portion of the polymer. Suitable soaps for this purpose are base metal soaps of organic acids which are normally solid. For example, sodium soaps of hydrogenated fish oil acids, sodium salts of resins, rosins, or high molecular weight naphthenic acids. In these soaps the organic acid radical contains on the average of more than 18 carbon atoms per molecule. From about 1% to about 3% of such soaps may be employed to replace about 5% of the isobutylene polymer without detracting from the desired effects.

The thick oil incendiary mixture may be modified by the addition of other agents for various needs. For example, metallic sodium or metallic potassium may be added to promote ignition in the presence of water. Phosphorus of yellow or red varieties may be added to promote ignition by spontaneous ignition on exposure to air. Carbon bisulfide or alkyl halides or higher boiling petroleum fractions such as gas oil or oils of the light lubricating oil boiling range or fatty oils such as cottonseed oil may be added to modify the flash point of the naphtha. Also, the oil incendiary agent may be used in conjunction with other incendiary or priming compositions, such as those of the thermite type, e. g. mixtures of iron oxide with powdered aluminum, and magnesium.

The construction of airplane incendiary bombs in which the improved incendiary mixtures are placed may be any of the well known types. These consist of three main parts: the bomb body, stabilizing tail fins to maintain the bomb in vertical position when dropping; and a fuse mechanism for starting ignition on impact of the bomb. The fuse may be made to ignite a priming mixture of the thermite type or powder train, which in turn ignites the oil charge, and also, if desired, to detonate a charge of high explosive carried in a tube or booster in the center of the bomb. Black powder may be used to form the powder train.

The fuse mechanisms in the bombs may be controlled by impact or time or both and may follow well established principles. In one common form of use, a spring coil holds back a striking pin from a detonating cap until inertia of a movable part on impact closes the spring and drives the striking pin into contact with the cap. In a simpler mechanism, the cap containing a fulminate detonator, is protected from contact with the striking pin by an intervening piece of metal until impact breaks the metal.

The following example is given with reference to the accompanying drawing which illustrates a form of bomb in which the incendiary agent formulated in accordance with the present invention may be used but the invention is not restricted to this example or the particular arrangement shown. A cross-sectional elevation view of the bomb structure is shown in the drawing.

The body of the bomb consists of a front or nose portion 1, preferably made of steel having a thickness of 1/8" or 1/4", or even thicker, to permit penetration through light building roofs without breaking, and a rear portion 2, preferably made of thin sheet material, such as zinc, aluminum, steel, etc., having a thickness of between about 1/64" and 1/8", depending upon the size of the bomb which may range from 5 lbs. or 10 lbs. to 1,000 lbs. or 2,000 lbs., or more. If desired, the rear portion 2 of the bomb may be made of suitable non-metallic material, such as various plastics, e. g. Bakelite, etc., or may be made of fibrous material, such as paper or cloth impregnated with a suitable composition such as phenol formaldehyde (Bakelite) resins, glyptal resins, etc., to impart rigidity and oil-proof characteristics to the fibrous material. At the rear extremity of the rear portion 2 a tail 3 is provided which may be made of thin sheet iron, or aluminum, etc., or any other suitable thin rigid sheet material, such as plywood or heavy paper board impregnated with a suitable water-proofing composition. If the rear portion 2 and the tail 3 are both made out of the same metal, such as both made of steel or both made of aluminum, they may be fastened together by welding. On the other hand, if they are made of two dissimilar materials, the tail may be fastened to the body by means of suitable lugs 4 which may be welded, bolted, or otherwise attached to the body portion 2 and then the tail 3 may be bolted, riveted, welded or otherwise attached to said lugs 4. The front body portion 1 is filled with a suitable igniting charge 5, such as thermite, while the rear body portion is filled with the oil incendiary composition 6 which constitutes the primary feature of this invention.

To ignite the incendiary composition 6, an impact ignition mechanism is provided at the nose of the body portion 1, this mechanism consisting of a firing pin 7, normally held locked by the safety pin 8, and a detonating cap 9, which may suitably consist of mercury fulminate alone or with a small addition, e. g. 10-20%, of a flame producer, such as potassium chlorate or antimony sulfide, which detonating cap in turn sets off a thermite igniting charge suitably contained in a thin tube 10 made of iron, aluminum or other suitable metal, which in turn ignites a charge of thermite in the larger tube 11 which may also be made of thin metal, such as iron, aluminum, etc. A thin partition wall 12 made of a suitable sheet material made of zinc, steel, aluminum or suitable plastic or other oil-proof sheet material, may be used to separate the incendiary oil charge 6 from the thermite 5.

In use, the safety pin 8 is removed by pulling out the release wire 13 before the bomb is released from the airplane, and then upon landing, the impact of the bomb against the firing pin 7 will cause it to hit against the detonating cap 9 which in turn fires the thermite-igniting charge 14 in the tube 10 and which in turn ignites the thermite 5 as well as the thermite in the tube 11 which in turn ignites the oil incendiary charge 6.

Although the composition of the thermite 5 and the thermite igniter 14 may be varied considerably, as is well known, the following figures are given as a general guide. The thermite 5 may suitably contain 20-30% by weight of finely powdered aluminum and the balance—80-70% iron oxide (ordinarily magnetic iron oxide or hammer scale is used, although corresponding proportions of other iron oxides may be used). The preferred composition of this thermite is about 22-25% by weight of aluminum and 78-75% of magnetic iron oxide, both materials being finely powdered and well mixed. If desired, they may be bonded with sodium silicate solution, e. g. 40° Bé. silicate, or by sulfur, using about 15% based on the weight of thermite. Also, a solvent solution of nitrocellulose may be used. In any case the mixture is molded and baked dry. If desired, other oxidizing agents may be added, such as barium nitrate, as for instance in the so-called flaming thermite, which is composed of 3 parts by weight of aluminum powder, 8 parts of iron oxide (hammer scale) and 6 parts of barium nitrate. Also if desired, instead of using the ordinary thermite, this may be replaced by the mixture called thermate, which ordinarily is made of about 80% by weight of thermite and 20% by weight of a first fire mixture or match mixture composed of barium nitrate, flake aluminum, grain aluminum, black powder and a small amount of linseed or castor oil to facilitate pelleting.

The thermite-igniter 14 when used in a nonscattering type bomb should consist of aluminum powder and black iron oxide to which a substantial amount of barium peroxide has been added. For a scattering type of bomb a suitable composition comprises about 9 parts by weight of magnesium powder and about 13 parts of potassium perchlorate, which composition has been used under the name "Ophorite."

If desired, although in many cases not necessary, a small charge of black powder (consisting of sodium or potassium nitrate, charcoal and sulfur) may be used between the mercury-fulminate detonating cap 9 and the thermite igniter 14.

If it is desired to have the incendiary oil 6 scattered over a larger area than would occur when the bomb merely breaks due to the falling impact, an explosive charge, such as black powder alone or together with additional materials, such as barium nitrate and powdered aluminum, may be used in the place of the thermite 5 both in the front body portion 1 and in the tube 11. In such a case the powder charge in 1 may communicate directly with that in the tube 11 without the use of tube 10, or if such tube 10 is used, it should contain a powder charge containing sufficient barium nitrate or other oxidizing agent to make it burn faster than the powder charge in the nose 1 and tube 11.

As alternative constructions of the incendiary bomb of this invention, the impact ignition mechanism may be located in the tail of the bomb instead of in the nose, and may be set in motion by the momentum of the bomb instead of by actual contact when the bomb lands. As a still further alternative, a pressure ignition mechanism may be used which will cause the bomb to explode and ignite when the barometric pressure and/or the pressure due to the rush of air past an orifice in the shell reaches a predetermined amount.

This application is a continuation-in-part of our copending patent application Serial No. 436,594, filed March 28, 1942, Patent No. 2,445,311, July 20, 1948.

The foregoing description is merely illustrative, and alternative arrangements may be made. Although specific examples have been given of the composition of the oil incendiary agent, other modifications may be made which come within the scope of the invention as set forth in the appended claims.

We claim:

1. An almost semi-solid oil incendiary composition comprising a volatile combustible hydrocarbon liquid thickened to a consistency within the range of a viscous liquid to a gummy mass, with 1 to 25% by weight of a high molecular weight polymer of a mono-olefinic polymerizable monomeric organic compound, said polymer having an average molecular weight between about 100,000 and 3,000, and the arithmetic product of the percent of polymer times the mol. wt. of the polymer being at least 75,000.

2. An almost semi-solid oil incendiary composition comprising a volatile combustible organic liquid, the major proportion of which consists of hydrocarbons, thickened to a consistency within the range of a viscous liquid to a gummy mass, with about 1 to 25% by weight of a substantially saturated normally plastic solid hydrocarbon polymer having a molecular weight between about 100,000 and 3,000, and the arithmetic product of the percent of polymer times the mol. wt. of the polymer being at least 75,000.

3. Composition according to claim 2 in which the polymer is polyisobutylene.

4. An almost semi-solid oil incendiary composition comprising at least about 75% by weight of a petroleum hydrocarbon liquid of the gasoline to kerosene boiling range, thickened to a consistency within the range of a viscous liquid to a gummy mass, with about 5% to 15% by weight of a normally plastic polyisobutylene having a molecular weight of at least 3,000, and the arithmetic product of the percent of polymer times the mol. wt. of the polymer being at least 75,000.

5. An oil incendiary bomb comprising a volatile combustible hydrocarbon liquid thickened with 1 to 25% by weight of a high molecular weight polymer of a mono-olefinic polymerizable monomeric organic compound, said polymer having an average molecular weight between about 100,000 and 3,000, and the arithmetic product of the percent of polymer times the mol. wt. of the polymer being at least 75,000.

6. An oil incendiary bomb comprising an oil incendiary composition consisting essentially of at least 75% by weight of a petroleum hydrocarbon oil of the gasoline to kerosene boiling range, thickened to an almost semi-solid consistency with about 5% to 15% by weight of a normally plastic polyisobutylene having a molecular weight of at least 3,000, and the arithmetic product of the percent of polymer times the mol. wt. of the polymer being at least 75,000.

7. An oil incendiary bomb having a substantially streamlined tubular shape, a thick steel shell in the front section to permit penetration of a building roof on impact, a thin rear casing, a tail guide, an ignition mechanism, a large body of thermite in the front section, an incendiary oil composition comprising at least 60% of the total volume of the bomb and located in the body to the rear of the front section and normally separated from the thermite in the front section by an oil-proof partition, and means for causing the ignition mechanism to ignite said thermite.

8. An oil incendiary bomb according to claim 7, having an impact ignition mechanism in the nose of the bomb, a small tube of thermite-igniting charge located longitudinally in the front section of the bomb to cause the impact ignition mechanism to ignite the body of thermite in the front section of the bomb and also to ignite a body of thermite in a longitudinally positioned tube in the center of the incendiary oil composition, the amount of said oil composition being about 50% to 80% of the total bomb volume, and the total amount of thermite being about 20% to 40% of the total bomb volume.

HENRY H. COOKE.
JOHN B. HOLTZCLAW.

REFERENCES CITED

The following references are of record in the file of this patent:

UNITED STATES PATENTS

| Number | Name | Date |
| --- | --- | --- |
| 1,317,551 | Chambers | Sept. 30, 1919 |
| 1,484,190 | Ray | Feb. 19, 1924 |
| 2,049,062 | Howard | July 28, 1936 |